United States Patent
Vaccaro (10) Patent No.: US 11,362,502 B2
(45) Date of Patent: Jun. 14, 2022

(54) ADAPTER FOR CABLE HANGER

(71) Applicant: CommScope Technologies LLC, Hickory, NC (US)

(72) Inventor: Ronald A. Vaccaro, Taylorsville, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/088,295

(22) Filed: Nov. 3, 2020

(65) Prior Publication Data

US 2021/0151971 A1    May 20, 2021

Related U.S. Application Data

(60) Provisional application No. 62/935,782, filed on Nov. 15, 2019.

(51) Int. Cl.
| | |
|---|---|
| *H02G 3/32* | (2006.01) |
| *F16L 3/00* | (2006.01) |
| *F16B 21/08* | (2006.01) |
| *F16L 3/12* | (2006.01) |
| *H02G 3/04* | (2006.01) |

(52) U.S. Cl.
CPC ............... *H02G 3/32* (2013.01); *F16L 3/12* (2013.01); *F16L 3/00* (2013.01); *H02G 3/0456* (2013.01)

(58) Field of Classification Search
CPC . H02G 3/32; H02G 3/0456; F16L 3/00; F16L 3/221; F16L 3/13; F16L 3/1058; F16L 3/12; F16L 3/16; E04B 2/78; F16B 21/00
See application file for complete search history.

(56) References Cited

U.S. PATENT DOCUMENTS

| | | | | |
|---|---|---|---|---|
| 2,470,814 A | * | 5/1949 | Hain | F16L 3/221 |
| | | | | 248/68.1 |
| 8,191,836 B2 | | 6/2012 | Richard | |
| 10,935,105 B2 | * | 3/2021 | Bell | H02G 1/08 |
| 2009/0294602 A1 | * | 12/2009 | Korczak | H02G 3/30 |
| | | | | 248/74.2 |
| 2014/0260083 A1 | | 9/2014 | Zhang et al. | |

(Continued)

FOREIGN PATENT DOCUMENTS

JP    2013249937 A    12/2013

OTHER PUBLICATIONS

"International Search Report and Written Opinion corresponding to International Application No. PCT/US2020/059059 dated Mar. 2, 2021".

*Primary Examiner* — Tan Le
(74) *Attorney, Agent, or Firm* — Myers Bigel, P.A.

(57) ABSTRACT

An adapter for a plurality of cable hangers includes: first, second and third mounting panels, each mounting panel including a round mounting hole, the mounting panels serially attached to each other at edges thereof, each mounting panel being disposed at an oblique angle relative to its adjacent mounting panels; a base attached with the first and third mounting panels; wherein the base includes features for mounting the adapter to a mounting structure; and wherein the adapter is a monolithic structure formed of a polymeric material; and further comprising projections on the mounting panels located and configured to limit rotation of a cable hanger mounted in one of the mounting holes.

8 Claims, 7 Drawing Sheets

(56) References Cited

U.S. PATENT DOCUMENTS

| | | |
|---|---|---|
| 2016/0281881 A1 | 9/2016 | Vaccaro et al. |
| 2016/0281883 A1 | 9/2016 | Vaccaro |
| 2017/0122460 A1 | 5/2017 | Joshi et al. |
| 2018/0135778 A1 | 5/2018 | Vaccaro et al. |
| 2019/0003616 A1 | 1/2019 | Wargo |
| 2019/0036315 A1 | 1/2019 | Song et al. |
| 2019/0383426 A1* | 12/2019 | Vaccaro ................ F16B 21/088 |
| 2019/0390797 A1* | 12/2019 | Bell ........................ H02G 3/32 |
| 2020/0109800 A1* | 4/2020 | Bell ........................ F16L 3/221 |

* cited by examiner

FIG. 1

{PRIOR ART}

FIG. 2

{PRIOR ART}

FIG. 3

{PRIOR ART}

FIG. 4

{PRIOR ART}

FIG. 5

{PRIOR ART}

FIG. 6

{PRIOR ART}

ADAPTER FOR CABLE HANGER

RELATED APPLICATION

The present application claims priority from and the benefit of U.S. Provisional Patent Application No. 62/935,782, filed Nov. 15, 2019, the disclosure of which is hereby incorporated herein by reference in its entirety.

FIELD OF THE INVENTION invention relates generally to devices for supporting cables and, in particular, to hangers for securing cables to support structures.

BACKGROUND OF THE INVENTION

Cable hangers are commonly used to secure cables to structural members of antenna towers and/or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. The locking projections of a hanger are inserted into a hole in the antenna tower (typically in the leg of the antenna tower, and typically a ¾ inch hole) to secure the hanger to the tower. Hangers can be "stacked" onto each other by inserting the locking projections of one hanger into the large aperture of the next hanger. One variety of cable hanger of this type is the SNAP-STAK® hanger, available from CommScope, Inc. (Joliet, Ill.). Other cable hangers are shown in U.S. Patent Publication Nos. 2016/0281881, 2016/0281883, and 2017/0122460, the disclosures of each of which are hereby incorporated herein by reference in full.

Figure 1:
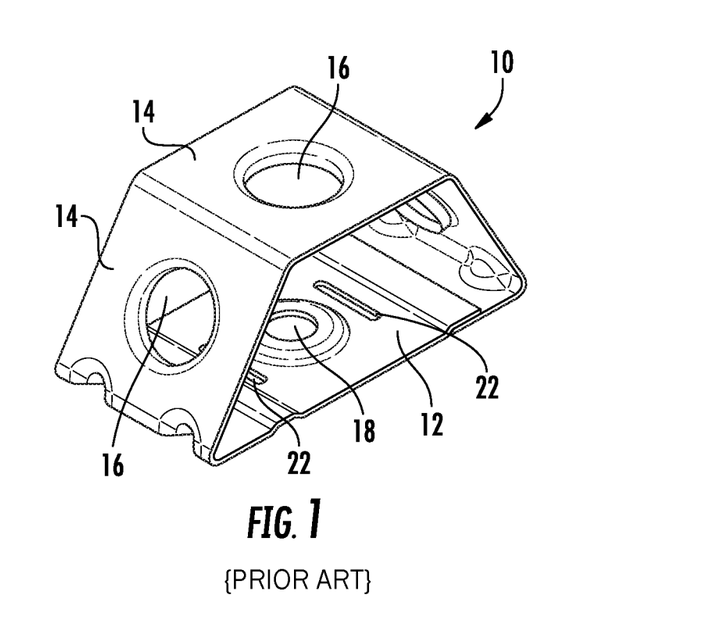
FIG. 1 is a perspective view of a prior art adapter for cable hangers.
Figure 2:
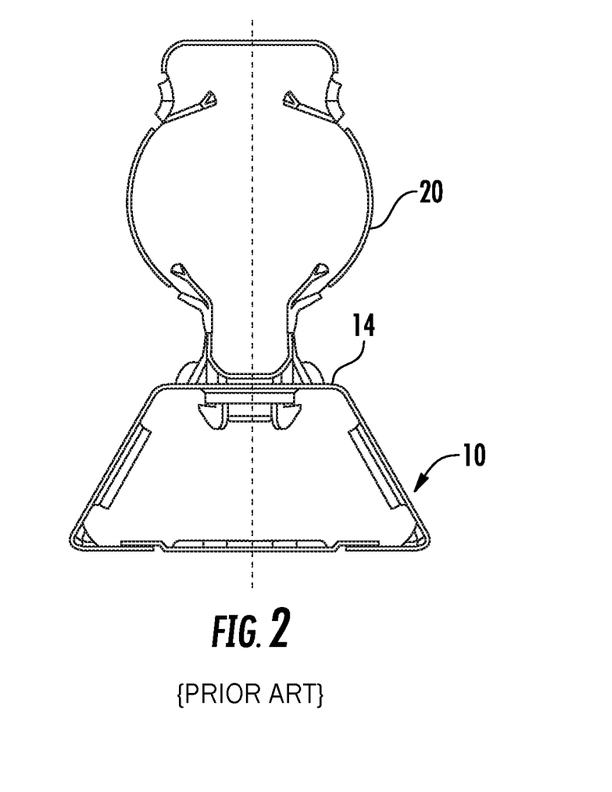
FIG. 2 is a top view of the adapter of FIG. 1 with a cable hanger mounted therein.
Figure 3:
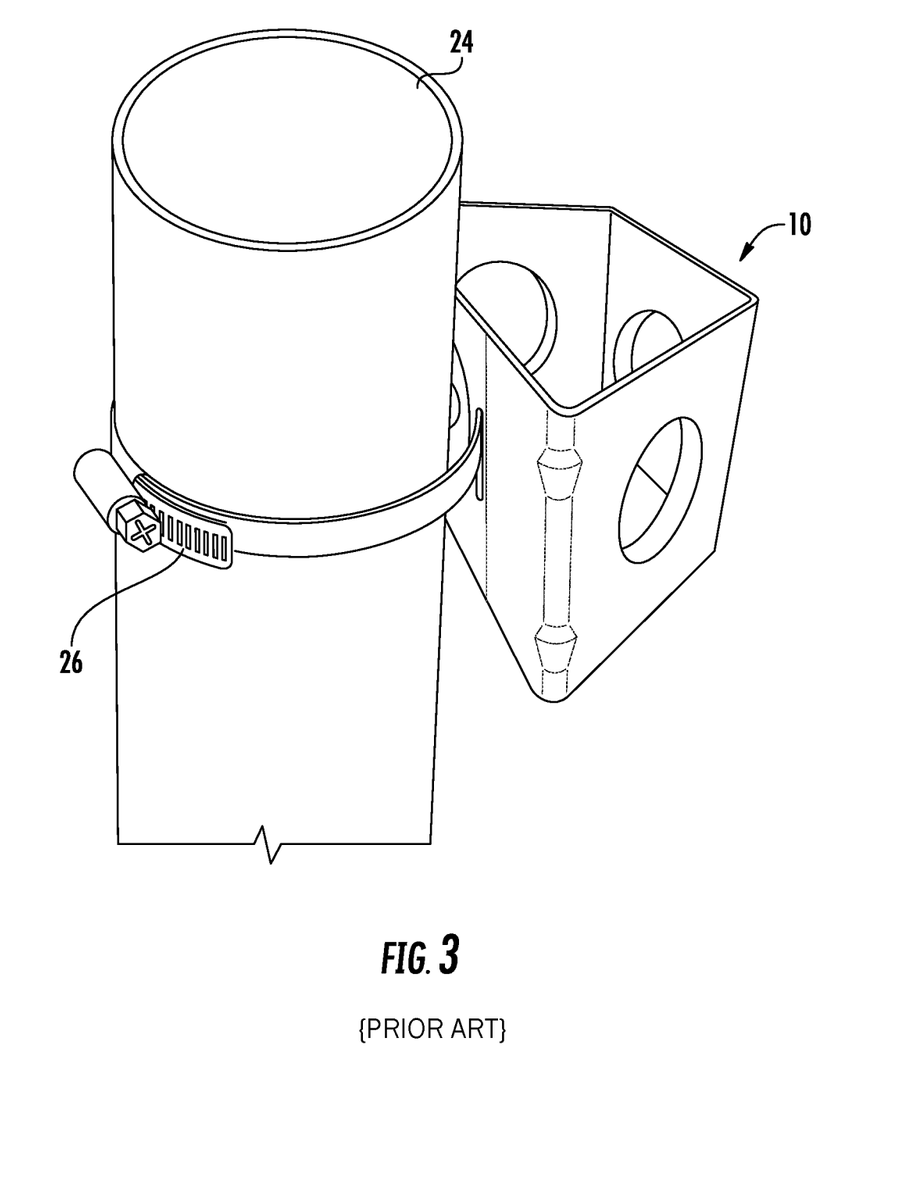
FIG. 3 is a perspective view of the adapter of FIG. 1 mounted to a pole via a hose clamp.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three serially-attached mounting panels 14. Each of the mounting panels 14 includes a mounting hole 16 (typically a nominal ¾ inch hole) that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

Figure 4:
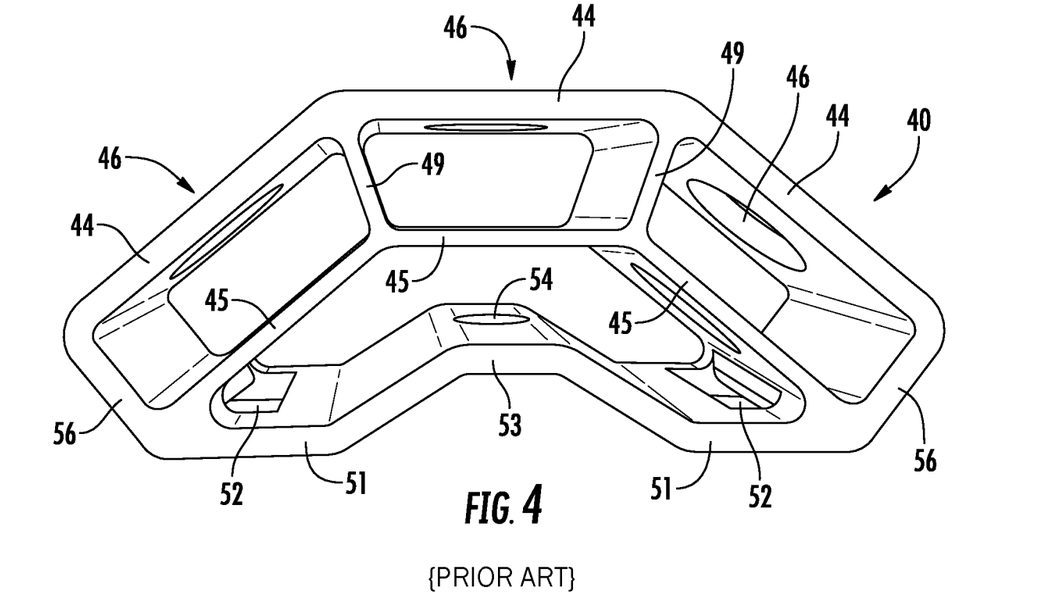
FIG. 4 is a top view of another prior art adapter for cable hangers.

A similar adapter 40 is shown in FIG. 4. The adapter 40 is formed of a polymeric material to address the possibility of passive intermodulation (PIM) being generated by a metal-on-metal joint near a cellular antenna or radio. The adapter 40 includes mounting panels 44 with mounting holes 46, each of which is underlain by a support panel 45 having a hole 47 that is generally parallel to the corresponding overlying mounting panel 44. Two braces 49 extend between the vertices of the mounting panels 44 and the support panels 45. The adapter 40 further includes two base sections 51 with slots 52 therein to receive a hose clamp for mounting the adapter on a pole. A three-part filling brace 53 extends between the base segments 51 and includes a mounting hole 54 for receiving a bolt that can be used to mount the adapter 40 to a pole. The base sections 51 include end panels 56 that merge with the ends of two of the mounting panels 44; two of the support panels 45 also terminate at the vertices of the base sections 51. The mounting panels 44 are typically disposed at an oblique angle to each other, often between about 130 and 155 degrees.

It may be desirable to provide additional configurations for mounting cable hangers.

SUMMARY OF THE INVENTION

As a first aspect, embodiments of the invention are directed to an adapter for a plurality of cable hangers. The adapter comprises: first, second and third mounting panels, each mounting panel including a round mounting hole, the mounting panels serially attached to each other at edges thereof, each mounting panel being disposed at an oblique angle relative to its adjacent mounting panels; and a base attached with the first and third mounting panels. The base includes features for mounting the adapter to a mounting structure. The adapter is a monolithic structure formed of a polymeric material. The adapter further comprises projections on the mounting panels located and configured to limit rotation of a cable hanger mounted in one of the mounting holes.

As a second aspect, embodiments of the invention are directed to an adapter for a plurality of cable hangers comprising: first, second and third mounting panels, each mounting panel including a round mounting hole, the mounting panels serially attached to each other at merging edges thereof, each mounting panel being disposed at an oblique angle relative to its adjacent mounting panels; and a base attached with the first and third mounting panels. The base includes features for mounting the adapter to a mounting structure. The adapter is a monolithic structure formed of a polymeric material. The distance between a center of each mounting hole and an adjacent merging edge is at least about 1 inch, and the oblique angle is between about 130 and 155 degrees.

As a third aspect, embodiments of the invention are directed to an adapter for a plurality of cable hangers comprising: first, second and third mounting panels, each mounting panel including a round mounting hole, the mounting panels serially attached to each other at edges thereof, each mounting panel being disposed at an oblique angle relative to its adjacent mounting panels; and a base attached with the first and third mounting panels. The base includes features for mounting the adapter to a mounting structure. The adapter is a monolithic structure formed of a polymeric material. The first and mounting third panels are offset from the second mounting panel.

As a fourth aspect, embodiments of the invention are directed to an adapter for a plurality of cable hangers comprising: an arcuate mounting surface having first, second and third round mounting holes, each mounting panel including a round mounting hole, each mounting hole being disposed at an oblique angle relative to its adjacent mounting holes; and a base attached with the mounting surface. The base includes features for mounting the adapter to a mounting structure. The adapter is a monolithic structure formed of a polymeric material. The oblique angle is between about 130 and 155 degrees.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Like numbers refer to like elements throughout. In the figures, certain layers, components or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "on," "attached to," "connected to," "coupled with," "contacting," etc., another element, it can be directly on, attached to connected to, coupled with or contacting the other element or intervening elements may also be present. In contrast, when an element is referred to as being, for example, "directly on," "directly attached to," "directly connected to," "directly coupled with," or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "above", "over", "upper", "lower", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 5:
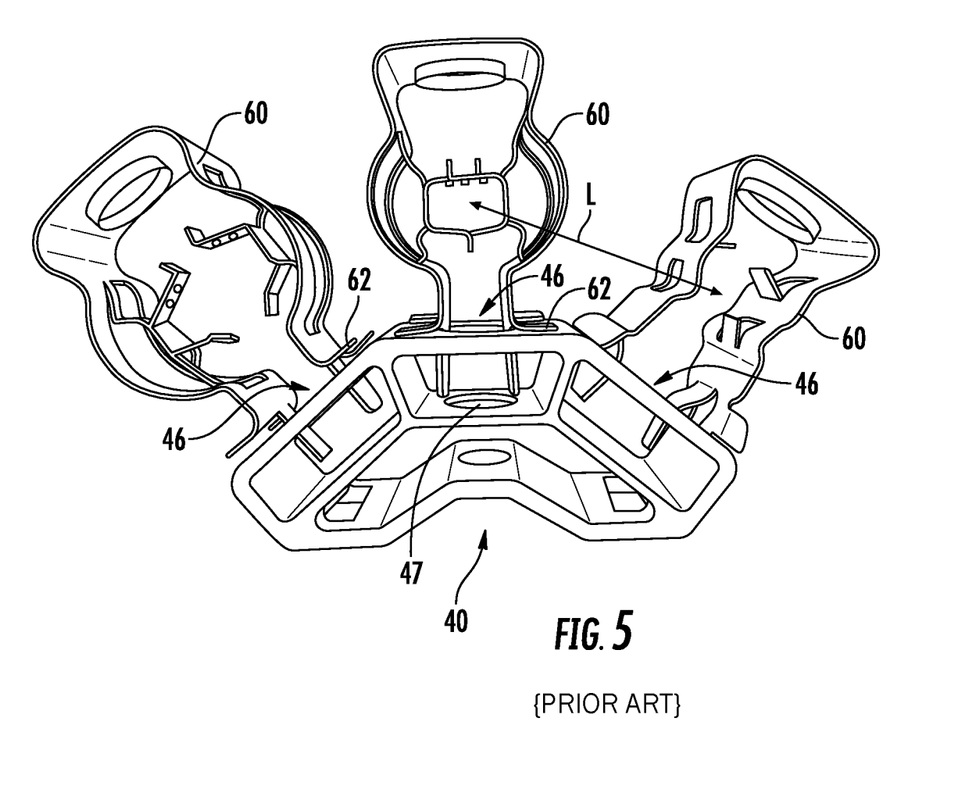
FIG. 5 is a top view of the adapter of FIG. 4 with three metal cable hangers mounted therein.
Figure 6:
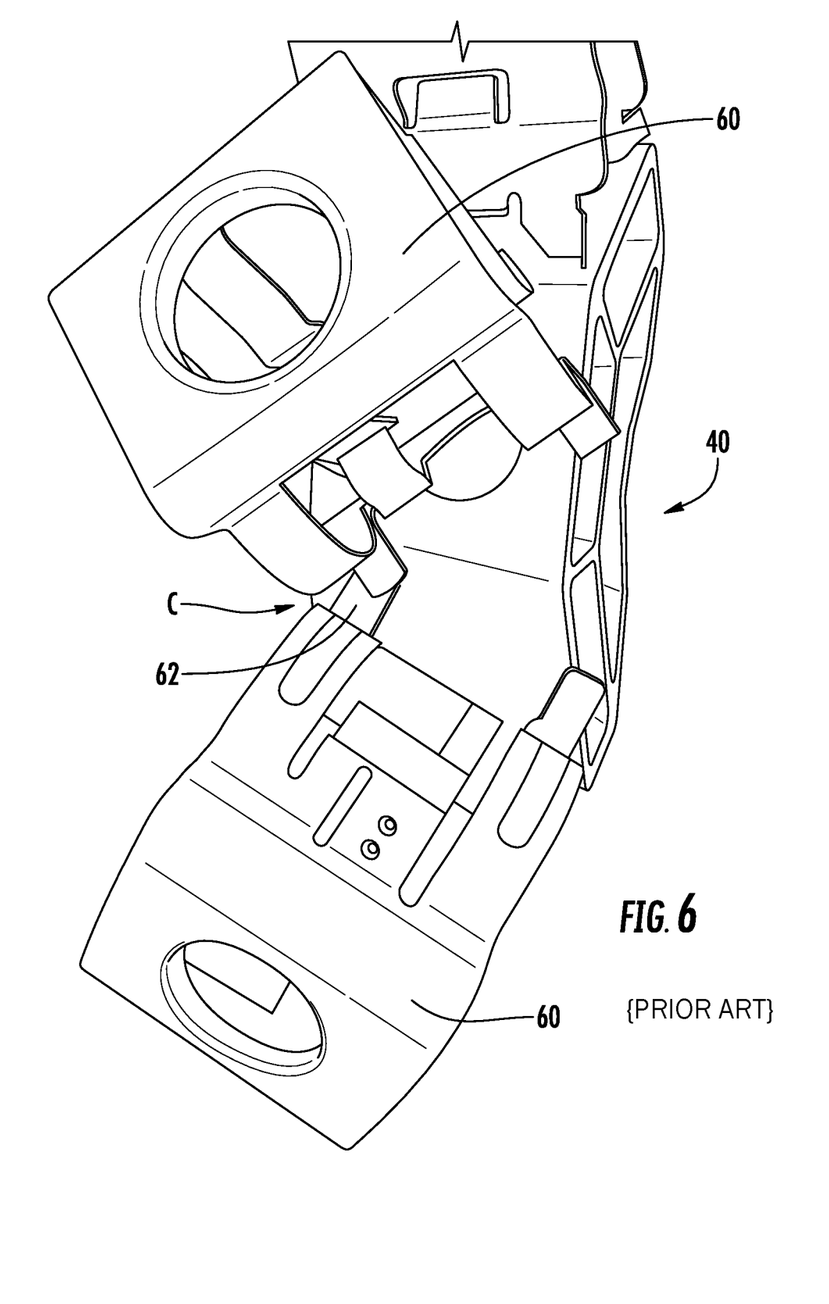
FIG. 6 is a front view of the adapter and cable hangers of FIG. 5 shown with the cable hangers rotated to contact each other.

Referring now to FIGS. 5 and 6, the adapter 40 is shown therein with three metal cable hangers 60 mounted in the mounting holes 46. As can be seen in FIG. 5, when the cable hangers 60 are mounted in the adapter 40 such that the cables are all parallel with each other and to a pole on which the adapter 40 would be mounted, there is sufficient room between cable hangers 60 that they do not contact each other. However, as shown in FIG. 6, if the cable hangers 60 are rotated due to cables being routed on non-parallel paths, the edges of the cable hangers 60 (particularly fingers 62 that provide stability to the mounted cable hanger 60) may contact each other at a location C. Such contact can create performance issues, particularly if the contacting cable hangers 60 are located near a cellular antenna, as the metal-to-metal contact can generate PIM that negatively impacts cellular performance.

Figure 7:
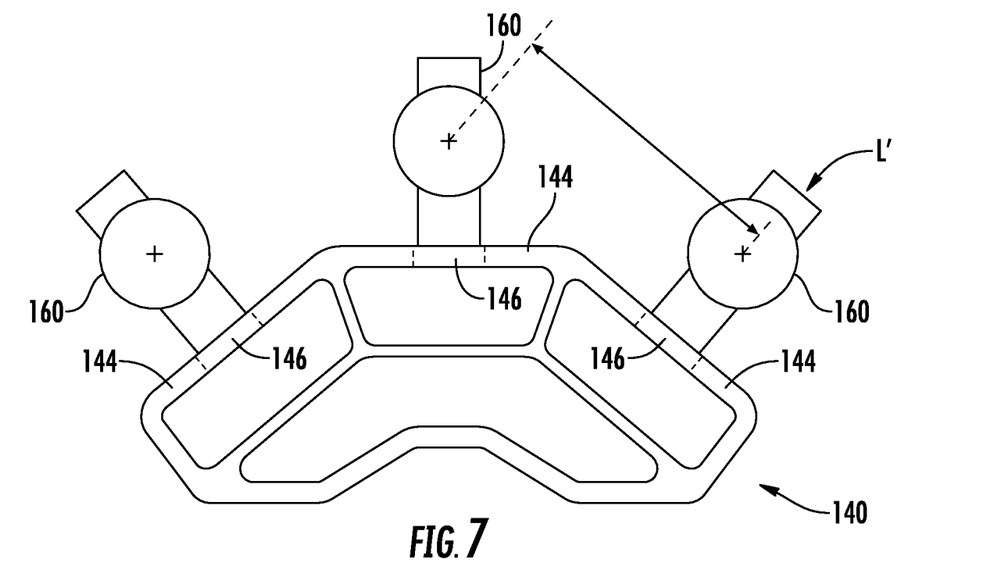
FIG. 7 is a schematic top view of an adapter for cable hangers according to embodiments of the invention.

Referring now to FIG. 7, an adapter 140 according to embodiments of the invention is shown therein. The adapter 140 is similar to the adapter 40, but includes mounting panels 144 that are configured so that their mounting holes 146 are separated by a greater distance than those of the adapter 40. As an example, the adapter 40 may have mounting panels 44 that are 1.5 inches in length L, whereas the adapter 140 may have mounting panels 144 that are about 2.0 inches in length L' or more. Increasing the length of the mounting panels 144 can separate the centers of the mounting holes 146 so that they are at least about 1.0 inch from the edges of an adjacent mounting panel 144, which can provide sufficient room that cable hangers 160 mounted therein (and in particular their fingers 162) do not contact each other irrespective of the orientation in which they are mounted. By eliminating metal-to-metal contact between cable hangers 60 mounted in adjacent mounting holes 146, the adapter 140 can prevent the generation of PIM by the cable hangers 160.

Figure 8:
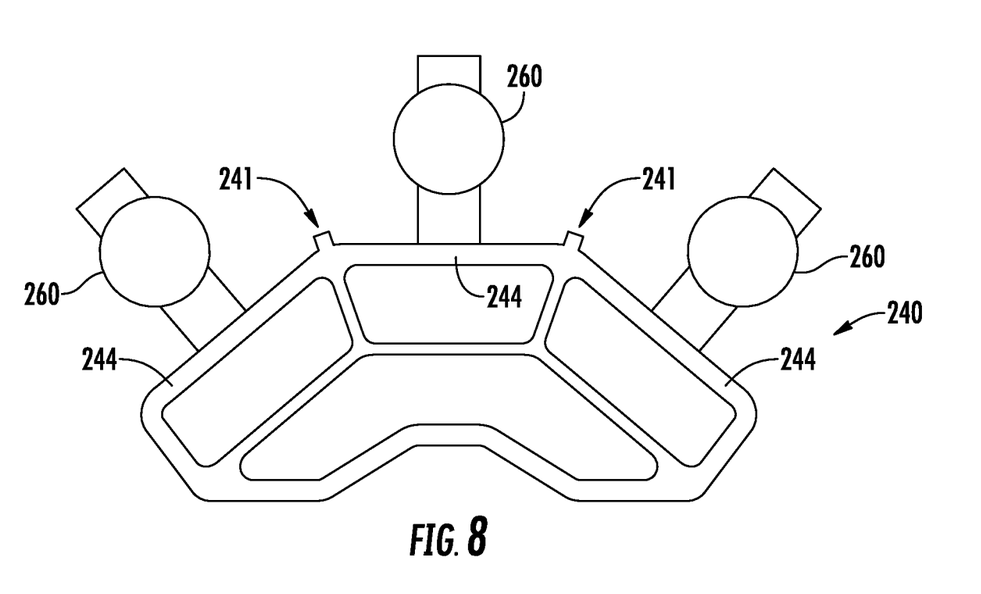
FIG. 8 is a schematic top view of an adapter for cable hangers according to additional embodiments of the invention.
Figure 9:
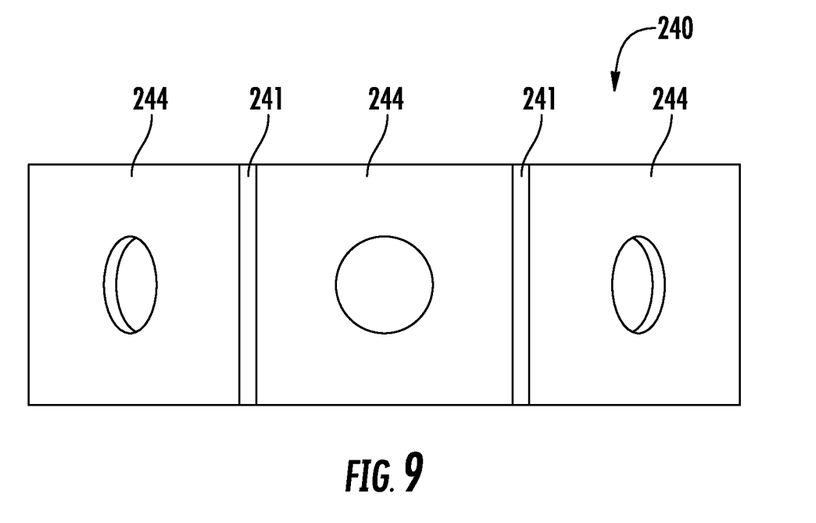
FIG. 9 is a front view of the adapter of FIG. 8.
Figure 10:
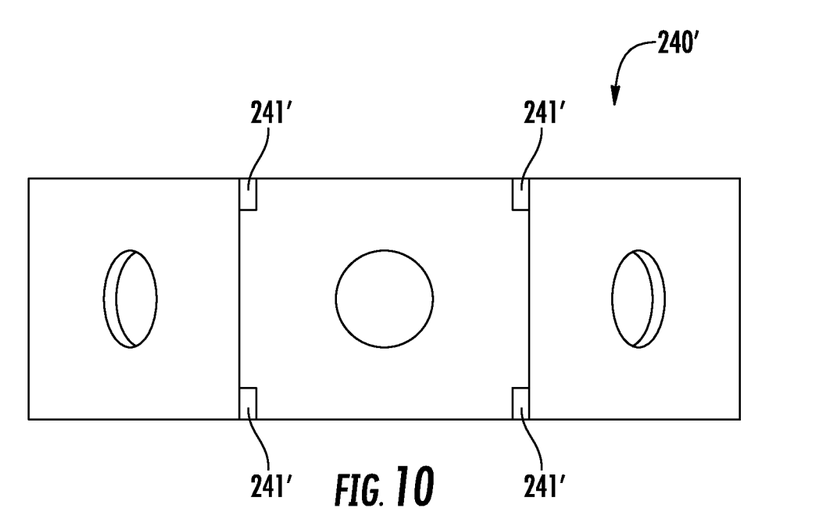
FIG. 10 is a front view of an adapter according to further embodiments of the invention.

Referring now to FIGS. 8 and 9, an adapter 240 illustrated therein is similar to the adapter 40, but includes projections 241 at the vertices of adjacent mounting panels 244. The projections 241 may be ribs that extend along the entirety of the edges of the mounting panels 244 (as shown in FIG. 9), may be nubs positioned at the top and bottom edges of the adapter 240 (as shown in FIG. 10 at 241'), or may be other types of projections located at other positions on the adapter 240 (for example, projections may be positioned on the undersides of the mounting panels 240). In any of these locations, the projections 241 can (a) provide a barrier that limits the rotation of cable hangers 260 in the mounting holes 246 and/or (b) prevent contact between two cable hangers 260 mounted in adjacent mounting holes 246. As such, the adapter 240 can prevent metal-on-metal contact between cable hangers that might otherwise produce PIM.

Figure 11:
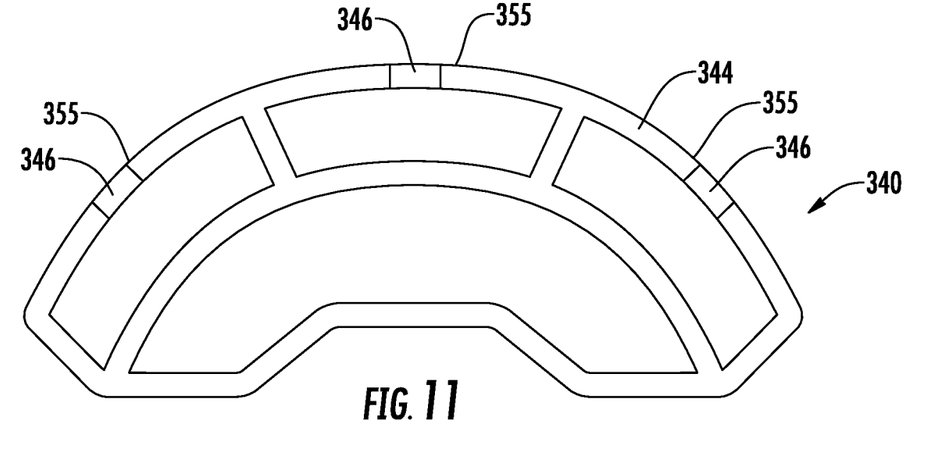
FIG. 11 is a schematic top view of an adapter for cable hangers according to still further embodiments of the invention.

Referring now to FIG. 11, another embodiment of an adapter, designated broadly at 340, is shown therein. Rather than having distinct mounting panels, the adapter 340 has a single arcuate mounting surface 344 in which three mounting holes 346 are located. In some embodiments, the mounting holes 346 may be surrounded by flattened areas 355 that enable a cable hanger mounted therein to be mounted flush in the adapter 340. The adapter 340 may also include projections such as those designated at 241 above.

Figure 12:
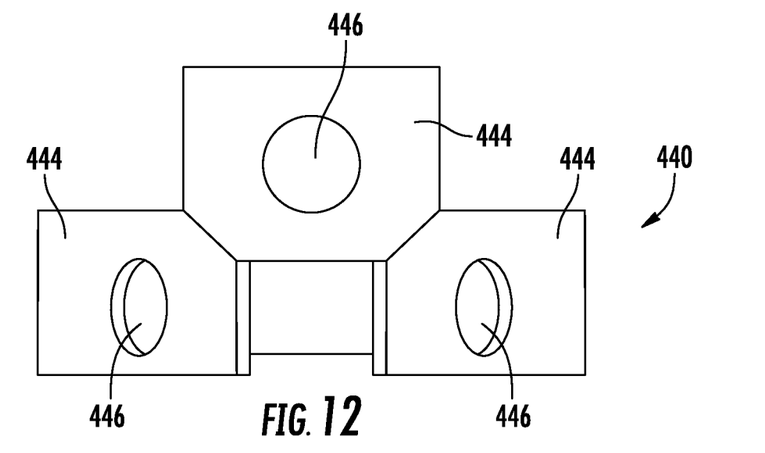
FIG. 12 is a top view of another adapter for cable hangers according to additional embodiments of the invention.
Figure 13:
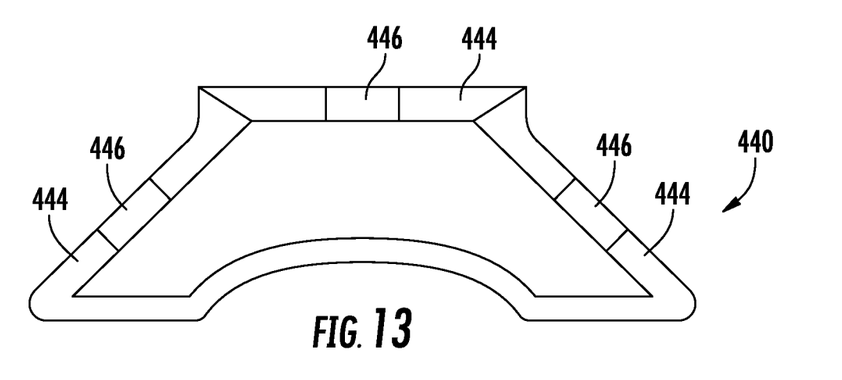
FIG. 13 is a front view of the adapter of FIG. 12.

Referring now to FIGS. 12 and 13, another embodiment of an adapter, designated broadly at 440, is shown therein. The adapter 440 includes three mounting panels 444 with mounting holes 446, but as can be seen in FIG. 12, the two end mounting panels 444 are offset from the center mounting panel 444. This offset can enable the mounting panels 444 to be smaller in length than those of the adapter 240 discussed above (therefore requiring less material for its construction) while providing mounting holes 446 that are sufficiently separated from each other to prevent cable hangers from contacting each other.

The adapters 140, 240, 340, 440 may be formed of any suitable material, with a polymeric material such as nylon, acetal, or high density polyethylene (either filled or unfilled) being typical.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

That which is claimed is:

1. An adapter for a plurality of cable hangers, comprising:
   first, second and third mounting panels, each mounting panel including a round mounting hole, the mounting panels serially attached to each other at edges thereof, each mounting panel being disposed at an oblique angle relative to its adjacent mounting panels;
   a base attached with the first and third mounting panels;
   wherein the base includes features for mounting the adapter to a mounting structure; and
   wherein the adapter is a monolithic structure formed of a polymeric material; and
   and further comprising projections on upper surfaces of the mounting panels and extending away from the base, the projections located and configured to limit rotation of a cable hanger mounted in one of the mounting holes.

2. The adapter defined in claim 1, wherein the projections are mounted at vertices between (a) the first and second mounting panels and (b) the second and third mounting panels.

3. The adapter defined in claim 1, further comprising three support panels, wherein each support panel is mounted generally parallel with a respective mounting panel.

4. The adapter defined in claim 1, wherein the mounting holes are nominally ¾ inch in diameter.

5. The adapter defined in claim 1, wherein the oblique angle is between about 130 and 155 degrees.

6. The adapter defined in claim 1, wherein the features for mounting comprise slots.

7. The adapter defined in claim 1, wherein the base comprises two base segments.

8. The adapter defined in claim 7, wherein the base segments comprise angled segments.

* * * * *